United States Patent
Uchida

[11] 3,953,139
[45] Apr. 27, 1976

[54] BALL JOINT
[75] Inventor: Yasuo Uchida, Hamamatsu, Japan
[73] Assignee: Ishikawa Tekko Kabushiki Kaisha, Tokyo, Japan
[22] Filed: Oct. 24, 1974
[21] Appl. No.: 517,407

[30] Foreign Application Priority Data
Nov. 6, 1973 Japan............................ 48-125083

[52] U.S. Cl. .............................................. 403/140
[51] Int. Cl.² ........................................ F16C 11/06
[58] Field of Search..................... 403/140, 135, 133

[56] References Cited
UNITED STATES PATENTS

| | | | |
|---|---|---|---|
| 3,063,744 | 11/1962 | Flumerfelt | 403/133 |
| 3,233,929 | 2/1966 | Herbenar | 403/140 |
| 3,249,375 | 5/1966 | Herbenar | 403/140 |
| 3,260,543 | 7/1966 | Henry-Biabaud | 403/140 |
| 3,413,023 | 11/1968 | Herbenar | 403/135 |
| 3,560,035 | 2/1971 | Kindel | 403/140 |

FOREIGN PATENTS OR APPLICATIONS
188,525   3/1964   Sweden.............................. 403/140

Primary Examiner—Andrew V. Kundrat
Attorney, Agent, or Firm—James E. Nilles

[57] ABSTRACT

This invention relates to a ball joint.

The ball joint comprises a bearing member made in one piece, and a ball stud provided with a spherical head slidably received in the bearing member.

The bearing member has a bearing surface comprising a pair of upper and lower surfaces of the bullethead shape juxtaposed to each other with the equator line of the spherical head of the ball stud being interposed therebetween the spherical head of the ball stud is supported by a pair of upper and lower bearing zones, and an annular pocket is formed on the equator line for storing a quantity of lubricant therein.

1 Claim, 4 Drawing Figures

BALL JOINT

BACKGROUND OF THE INVENTION

This invention relates to ball joints, and more particularly it is concerned with a ball joint of the type which is used with a mechanism for steering or suspension of a motor vehicle. This invention provides improvements in or relating to a ball joint of the permanent lubrication type in which a bearing member made in one piece from a plastic material is used and the spring member is eliminated.

The ball joint of this type which uses a bearing member made in one piece offers the advantages of having few component parts and being simple in construction. On the other hand, since such bearing member encloses the spherical head of ball stud, its opening must be smaller than the diameter of the spherical head. In order to eliminate the difficulty with which the spherical head of the ball stud is inserted into the bearing member through this small opening, the bearing member should be flexible. Also, a rubber-like elastomeric material is employed for making the bearing member because it is necessary to utilize the compression resilience of the material to compensate for wear. The bearing material of this type is low in mechanical strength because of its character. This makes it necessary to increase the size of the ball joint to enable the ball joint to withstand a high load applied thereto.

SUMMARY OF THE INVENTION

This invention has as its object the provision of a small ball joint of the permanent lubrication type in which a hard and resilient plastic material of high strength is used for making a bearing member in one piece, and which is capable of compensating for wear and withstanding a high load applied thereto.

The ball joint according to the invention is characterized in that the bearing member made of a hard and resilient plastic material which is given the property of compensating for wear by subjecting the hard and resilient plastic material to a bending elastic deformation, and not to a compression elastic deformation, in spite of the fact that it has hitherto been considered impossible to use a hard and resilient plastic material of high strength as a bearing member made in one piece and capable of compensating for wear because the material lacks softness and resilience.

In the ball joint according to the invention, the bearing member is formed with a pair of bearing surfaces of bullet-head shape (i.e., ellipsoidal or paraboloidal in shape) in order effectively to subject the plastic material to the bending elastic deformation, and the spherical head of the ball stud is supported by the annular bearing zones formed by this pair of bearing surfaces of bullet-head shape. An annular recess is formed in a position corresponding to the position of one of the annular bearing zones formed by the pair of bearing surfaces of bullet-head shape, so that the wall of the bearing member in the vicinity of one of the bearing zones can be subjected to elastic deformation.

The bearing member, made in one piece according to the invention, is also characterized by the feature that, before it is inserted into the bore of the socket, it has a pre-formed shape such as to eliminate the difficulty encountered in inserting the spherical head of the ball stud into the one piece bearing member. Upon inserting the bearing member into the bore of the socket, one portion of the one piece bearing member undergoes deformation and conforms to the shape of the inner wall surface of the socket and encloses the spherical head of the ball stud.

One of the bearing surfaces of the one piece bearing member which supports the spherical head of the ball stud is formed beforehand as a surface of revolution of bullet-head shape, while a portion corresponding to the other bearing surface is substantially cylindrical in shape when in a free state before assembly. The portion corresponding to the other bearing surface is deformed into a surface of revolution of bullet-head shape by being guided by the inner wall surface of the socket when the ball joint is assembled, so that the one piece bearing member forms a pair of bearing surfaces of bullet-head shape disposed on opposite sides of the equator of the spherical head of the ball stud which divides the spherical head into upper and lower portions of substantially the same size. Thus, the spherical head of the ball stud is supported by the annular bearing zones formed on the pair of annular bearing surfaces of bullet-head shape. At the same time, an annular pocket for containing a lubricant therein is formed near the equator of the ball stud. Also, an annular space is formed at one end portion of the bearing member in a position corresponding to that of one bearing zone and is disposed between the bearing member and a closing member, so that the wall of the bearing member in the vicinity of the bearing zone of one bearing surface of bullet-head shape undergoes bending elastic deformation and the spherical head of the ball stud is brought into pressing engagement with the one piece bearing member when the ball joint is assembled. Thus, the bearing member of the ball joint according to the invention has the ability to compensate for wear by virtue of its property of resuming its original form.

DESCRIPTION OF A PREFERRED EMBODIMENT

Figure 1:
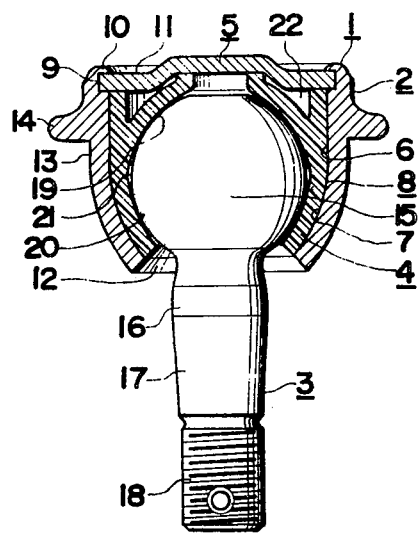
FIG. 1 is a vertical sectional view of the ball joint comprising one embodiment of the invention.

In FIG. 1, there is shown by way of illustration a ball joint according to the invention generally designated 1 which is adapted for use as a suspension ball joint for a motor vehicle. The ball joint 1 comprises a socket 2, a ball stud 3, a bearing member 4 made in one piece and a closing member 5.

The socket 2 which is made of a metallic material comprises a cylindrical inner wall surface 6, and an inner wall surface 7 contiguous with the cylindrical inner wall 6 and converging or tapering in going downwardly substantially in the form of a bullet head. The inner walls 6 and 7 define a bore 8 which is formed at one end with a major opening 11 and at the other end with a minor opening 12. The inner wall surface 6 is formed therein with an annular offset portion 9 and an annular shoulder 10 disposed near the major opening 11. The socket 2 is formed at its outer periphery with a cylindrical outer peripheral surface 13 adapted to fit in a suspension arm (not shown), and a flange 14 projected outwardly from the upper portion of the cylindrical outer peripheral surface 13.

The ball stud 3 which is made of a metallic material comprises a spherical head 15 having a center to be disposed in the bore 8 of the socket 2, and a stem 16 contiguous with the spherical head 15 and extending through the minor opening 12 of the socket 2. The stem 16 includes a tapering portion 17 and an externally threaded portion and is adapted to be fixed by a nut after being brought into wedge connection with a knuckle arm (not shown).

The closing member 5 is made of a metallic material and adapted to close the major opening 11 by inserting its marginal portion in the annular offset portion 9 formed in the inner wall surface 6 of the socket 2 and by bending the annular shoulder 10 inwardly to cover the marginal portion of the closing member 5.

The one piece bearing member 4 is made of a hard and resilient plastic material and adapted to be interposed between the inner wall surfaces 6 and 7 of the socket 2, the spherical head 15 of the ball stud 3, and the closing member 5, with the spherical head 15 being enclosed in the bearing member 4 for rotational and pivotal movements. The bearing member 4 is formed on its inner surface with an upper bearing surface 19 and a lower bearing surface 20 of bullet-head shape, so that the inner diameter of the bearing member grows smaller in going upwardly and downwardly from its central portion. As subsequently to be described, the pair of bearing surfaces 19 and 20 of the bullet-head shape support the spherical head 15 at annular bearing zones $B_1$ and $B_2$. The bearing surfaces 19 and 20 each have a largest diameter near an equator E of the spherical head 15 of the ball stud 3 at which the bearing surfaces 19 and 20 are contiguous with each other. An annular lubricant containing pocket 21 is formed between the inner wall of the bearing 4 and the spherical head 15 in a position in which it is disposed adjacent the equator E, while an annular space 22 is formed between the bearing member 4 and the closing member 5.

Figure 2:
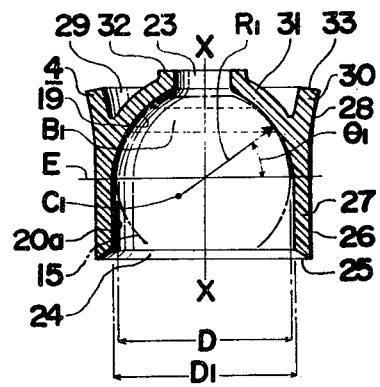
FIG. 2 is a vertical sectional view of the bearing member made in one piece which is in a free state before being assembled.

FIG. 2 shows the bearing member 4 in its free state. In the figure, dash-and-dot lines show the position and size of the spherical head 15 of the ball stud 3. When in a free state, the upper bearing surface 19 of bullet-head shape of the bearing member 4 is disposed above the equator E of the spherical head 15 of the ball stud 3 and has a maximum diameter portion $D_1$ in the vicinity of the equator E, and a cylindrical inner wall 20a which is contiguous with the maximum diameter portion $D_1$ and extends downwardly therefrom. The upper bearing surface 19 is connected to a minor opening 23 at its upper end, while the inner wall 20a is connected to a major opening 24 at its lower end. The upper bearing surface 19 of bullet-head shape can be obtained by revolving one portion of a circular arc of a radius of curvature $R_1$ about an axis X—X.

The annular bearing zone $B_1$ is disposed on a circumscribed circle formed by the spherical head 15 having a diameter D and the bearing surface 19 of bullet-head shape of a radius of curvature $R_1$. Thus, the radius of curvature of the upper bearing surface 19 and the diameter D of the spherical head 15 are in a relation $R_1 > \frac{1}{2}D$. The radius of curvature $R_1$ has a center $C_1$ whose position and latitude $\theta_1$ are determined such that the annular bearing zone $B_1$ is disposed near the center of the upper bearing surface 19 of bullet-head shape.

The bearing member 4 includes a cylindrical skirt 27 disposed in its lower portion. A substantially cylindrical outer peripheral surface 26 which extends upwardly from a lower end 25 of the bearing member 4 has a diameter which is substantially similar to the diameter of the cylindrical inner wall surface 6 of the socket 2. The cylindrical outer peripheral surface 26 has an upwardly diverging portion 28 which begins substantially at its intermediate portion. An annular recess 29 is formed at an upper end portion of the upwardly diverging wall portion 28, so that the upper portion of the bearing member 4 is bifurcated into an upwardly diverging wall portion 30 and a dome-shaped wall portion 31 disposed along the bearing surface 19.

Figure 3:
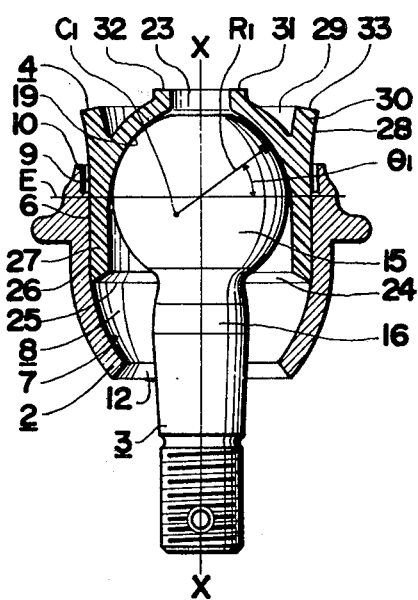
FIG. 3 is a vertical sectional view of the ball joint showing the socket, ball stud and one piece bearing member in a state of preliminary engagement with one another.
Figure 4:
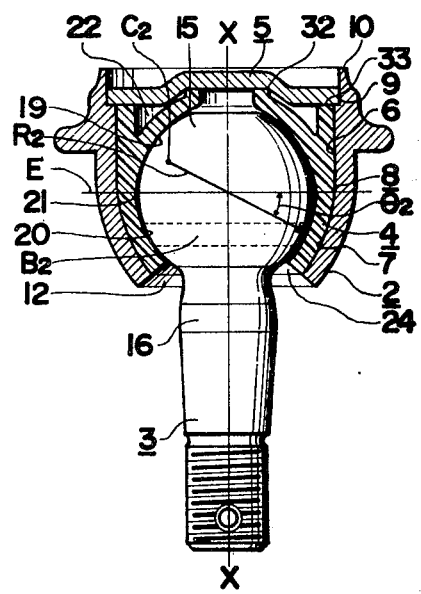
FIG. 4 is a vertical sectional view of the ball joint showing the manner in which the ball stud and the bearing member engage each other when force fitted into the socket.

The ball joint 1 is assembled as shown in FIG. 3 and FIG. 4. First of all, a lubricant is applied to the inner wall surface of the bearing member 4 or the spherical head 15 of the ball stud 3, and the spherical head 15 of the ball stud 3 is inserted into the bearing member 4. This brings the spherical head 15 into contact with one bearing surface 19 of bullet-head shape in a position which corresponds to the circumference thereof at the latitude $\theta_1$ with respect to the equator E. Since the inner diameter $D_1$ of the bearing member 4 is slightly greater than the outer diameter D of the spherical head 15, the bearing member 15 can be readily inserted into the bearing member 4.

The assembly of the ball stud 3 and the bearing member 4 formed as aforementioned is then inserted into the bore 8 of the socket 2. A lower end surface 25 of the bearing member 4 is inserted without undergoing substantially any deformation to a point of the curved inner wall surface 7 of the socket 2 at which the inner wall begins to converge downwardly in the form of a surface of bullet-shaped revolution. Thereafter, the bearing member 4 is force fitted into the bore 8 of the socket 2 by means of a press after applying a suitable jig or the closing member 5 at its upper end. By fitting the bearing member 4 in the bore 8 of the socket 2 in this way, the skirt 27 of the bearing member 4 is deformed to conform to the shape of the curved inner wall surface 7, and the other bearing surface 20 defined by the lower opening 24 is formed as shown in FIG. 4.

The other or lower bearing surface 20 is obtained by revolving a portion of an arc of a radius of curvature $R_2$ about the axis X—X of the ball stud 3. The upper bearing surface 19 and the lower bearing surface 20 are contiguous with each other at the equator E where the diameter of the bearing member 4 is maximized, and the annular pocket 21 for the lubricant is formed between the spherical head 15 and the inner wall surface of the bearing member 4 in the vicinity of the equator E.

The lower bearing surface 20 of bullet-head shape is determined in the same manner as the upper bearing surface 19. The annular bearing zone $B_2$ is disposed on a circumscribed circle formed by the spherical head 15 having the diameter D and the bearing surface 20 of the bullet-head shape of a radius of curvature $R_2$. Thus, the radius of curvature $R_2$ and the diameter D of the spherical head 15 is in a relation $R_2 > \frac{1}{2}D$. The revolution of the radius of curvature $R_2$ has a center $C_2$ whose position and latitude $\theta_2$ are determined such that the annular bearing zone $B_2$ is disposed near the center of the lower bearing surface 20 of bullet-head shape. The lower bearing surface 20 is in the form of a bullet-head whose pointed end is cut off by the lower opening 24 of the bearing member 4. Because of this, the curved inner wall surface 7 of the socket 2 is of a bullet-head shape which starts substantially in the vicinity of the equator E of the spherical head 15 whose position is determined beforehand. The radius of curvature of the inner wall surface 7 of the socket 2 is determined by taking into consideration the tickness of the skirt 27 relative to the radius of curvature $R_2$. The center and latitude of the radius of curvature of the inner wall surface 7 can be the same as those of the lower bearing surface 20.

The curvature of the curved inner wall surface 7 of the socket 2 and the thickness of the skirt 27 of the bearing member 4 can be suitably varied. The lower bearing surface 20 of bullet-head shape contiguous with the upper bearing surface 19 of bullet-head shape in its free state can be made to open outwardly by several degrees. The lower bearing surface 20 of the aforementioned shape may be deformed to conform to the shape of the inner wall surface 7 of the socket 2 which tapers in going downwardly so as to give a perfect shape to the lower bearing surface 20 of bullet-head shape.

The spherical head 15 of the ball stud 3 is supported on two circumferences which are in the positions of the latitudes $\theta_1$ and $\theta_2$ in upper and lower semi-spheres. Since portions of the bearing member 4 near the two circumferences of the spherical head 15 are preloaded, they undergo deformation and constitute contact zones of a certain width. Thus, the annular bearing zones $B_1$ and $B_2$ of the bearing surfaces 19 and 20 of bullet-head shape are formed with respect to the spherical head 15 of the ball stud 3. The width of each of the pair of annular bearing zones $B_1$ and $B_2$ can be varied depending on the radii of curvature of the bearing surfaces of bullet-head shape. This permits adjustment of the area in which friction occurs. However, since the spherical head 15 is not in contact with the bearing member 4 on its entire surface, smooth rotation of the spherical head 15 is ensured.

The upwardly diverging portion 30 of the bearing member 4 has an outer diameter which is greater than the inner diameter of the socket 2 at the inner wall surface 6 of the latter. Because of this, the upwardly diverging wall portion 30 of the bearing member 4 is subjected to bending elastic deformation and bent radially inwardly by the surface 6 when the bearing member 4 is force fitted into the bore 8 of the socket 2. Also, the dome-shaped wall portion 31 of the bearing member 4 is subjected to bending elastic deformation when the spherical head 15 begins to come into contact with the annular bearing zones $B_1$ and $B_2$, since the dome-shaped wall portion 31 near the bearing zone $B_1$ has an upper end surface 32 pressed by the closing member 5 and the annular recess 29 is provided. Thus, an annular chamber 22 is formed between the closing member 5 and the bearing member 4 because of the presence of the annular space 29 between the upwardly diverging wall portion 30 and dome-shaped wall portion 31.

In this way, the closing member 5 is brought into pressing engagement with an upper end portion 33 of the upwardly diverging wall portion 30 and an upward end portion of the dome-shape wall portion 31 and into abutting engagement with the annular offset portion 9 of the socket 2 while preloading the bearing member 4 by its flexural resilience. The annular shoulder 10 disposed at the edge of the major opening 11 of the socket 2 is bent inwardly by roller crimping, so that the closing member 5 is fixed in place to provide for effective sealing as shown in FIG. 1. Thus, the ball joint 1 is completed.

As a hard and resilient plastic material used for producing the bearing member according to the invention, a self-lubricating plastic material is recommended which has superb mechanical properties and a restitution property or a property by which the material returns to its original shape like a spring when an external force deforming the material is released. Materials which meet these requirements include, among others, aromatic polyesterpolymers. Particularly, UPP-105 and UPM-105-P-2 can best serve the purpose of the invention which are among the UP polymers manufactured by Unitika Company in Japan. The principal properties of these materials are as follows:

| Properties | UPP-105 | UPM-105-P-2 | Test Methods (ASTM) |
|---|---|---|---|
| Tensile Strength Kg/cm$^2$ | 750 | 830 | D-638 |
| Breaking Elongation % | 62 | 26 | D-638 |
| Bending Modulus of Elasticity Kg/cm$^2 \times 10^2$ | 188 | 201 | D-790 |
| Bending Restitution Loss % | 2 | 2 | |
| Compression Strength Kg/cm$^2$ | 960 | 980 | D-695 |
| Impact Strength Kg.cm/cm Notch | 6.0 | 31 | D-256 |
| Hardness Rockwell M | 93 | 97 | D-785 |
| Specific Gravity | 1.21 | 1.24 | |
| Thermal Deformation Temperature (18.6Kg/cm$^2$)°C | 164 | 132 | |

As a material for the bearing member according to the invention, a polyacetal resin may also be used.

According to the invention, the spherical head of the ball stud is supported by annular bearing zones formed on a pair of bearing surfaces of bullet-head shape in a one piece bearing member, one annular bearing zone primarily performing the function of compensating for wear by virtue of its force of restitution because it is positioned against the annular space and has a high degree of elastic deformation, while the other bearing surface is primarily responsible for bearing a load because its outer wall is in firm engagement with the inner wall surface of the socket. The annular space formed by the annular recess formed beforehand in the bearing member and the closing member cooperates with one annular bearing zone to perform a shock absorbing function, whereby vibrations and impacts of the complex form to which the ball stud is subjected axially or at right angles to its axis can be absorbed and damped.

Also, according to the invention, an annular pocket for retaining a lubricant is formed between the spherical head of the ball stud and the bearing member near the equator of the spherical head. By this arrangement, a lubricant contained in the pocket can be supplied to the bearing surfaces, thereby ensuring smooth rotation of the spherical head by smooth lubrication of the surfaces in engagement with each other.

When the ball joint is assembled, the outer periphery of the bearing member is deformed to conform to the shape of the inner wall surface of the socket enclosing the spherical head of the ball stud. This eliminates the difficulty which would otherwise be encountered in producing a bearing member made in one piece from a hard and resilient plastic material and inserting the spherical head of a ball stud in such bearing member. After the bearing member is assembled, its openings can be minimized. This enables to maximize the area of the bearing surface of the bullet-head shape which is responsible for bearing a load, to increase the latitude which the designer has as to the width and position of the annular bearing zones, and to increase the capacity of the ball joint to bear a load.

From the foregoing description, it will be appreciated that the invention comprises novel features by which a hard and resilient plastic material of high strength can be used for producing a one piece bearing member and a ball joint of the permanent lubrication type which is small in size and which can bear a highload. These features include the annular recess provided for one of a pair of annular bearing surfaces and enabling the bearing zone to perform the function of compensating for wear by virtue of the bending elasticity of the wall of the bearing member near such bearing zone. It is also a feature of the invention that the bearing member which is produced in a suitable form beforehand can be deformed when it is assembled with other members to provide a ball joint, thereby eliminating the difficulty which is encountered in the prior art in assembling a bearing member with other members to provide a ball joint.

What is claimed is:

1. A ball joint comprising a socket including a bore defined by a cylindrical inner wall surface and a converging hemispherical inner wall surface contiguous with said cylindrical inner wall surface and openings each formed at one end of said bore, a ball stud including a spherical head disposed in said bore of said socket and a stem contiguous with said spherical head and extending through one of said openings of said socket, a one piece bearing member arranged between said inner wall surface of said socket and said spherical head of said ball stud for rotatably enclosing said spherical head of said ball stud, said one piece bearing member being made of a relatively hard and resilient plastic material, and a closing member hermetically closing the other of said openings of said socket and fixed to said socket in pressing engagement with an end portion of said one piece bearing member, said one piece bearing member when viewed in longitudinal section being formed with a pair of bearing surface portions facing to each other, each of said bearing surface portions being of paraboloidal shape, said pair of bearing surface portions being disposed on opposite sides of an equator of said spherical head of said ball stud, said pair of bearing surface portions forming a pair of annular bearing zones for supporting said spherical head, each of said pair of bearing surface portions having a maximum diameter near the equator of the spherical head and being contiguous with each other to provide an annular pocket for storing a lubricant between said spherical head and said bearing member, said one piece bearing member being formed at said end portion thereof with an annular recess which corresponds in axial position to the annular bearing zone of one of said pair of bearing surface portions, so that a closed annular space is formed between said closing member and said bearing member by virtue of the presence of said annular recess and the end portion of said bearing member inside of said annular recess is supported by said closing member, the outer surface of said one piece bearing member is on a substantially cylindrical skirt which is deformed to conform to the shape of the hemispherical inner wall surface of the socket so as to form the paraboloidal shape bearing surfaces when the bearing member is inserted into the bore of the socket.

* * * * *